April 30, 1940.     F. A. GROUNDS ET AL     2,198,913
METHOD FOR BINDING BALES OF HAY OR THE LIKE
Filed May 10, 1938     4 Sheets-Sheet 2
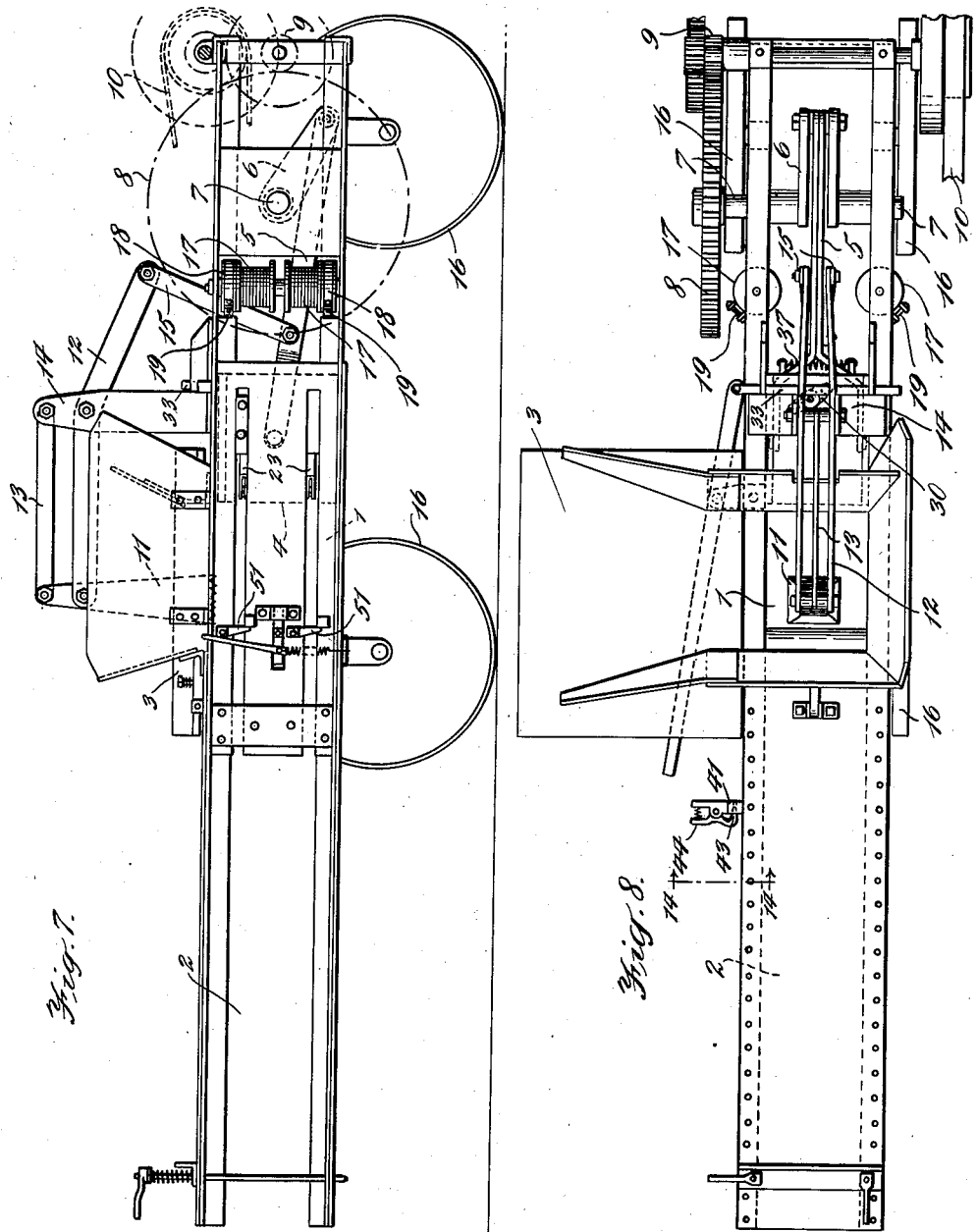

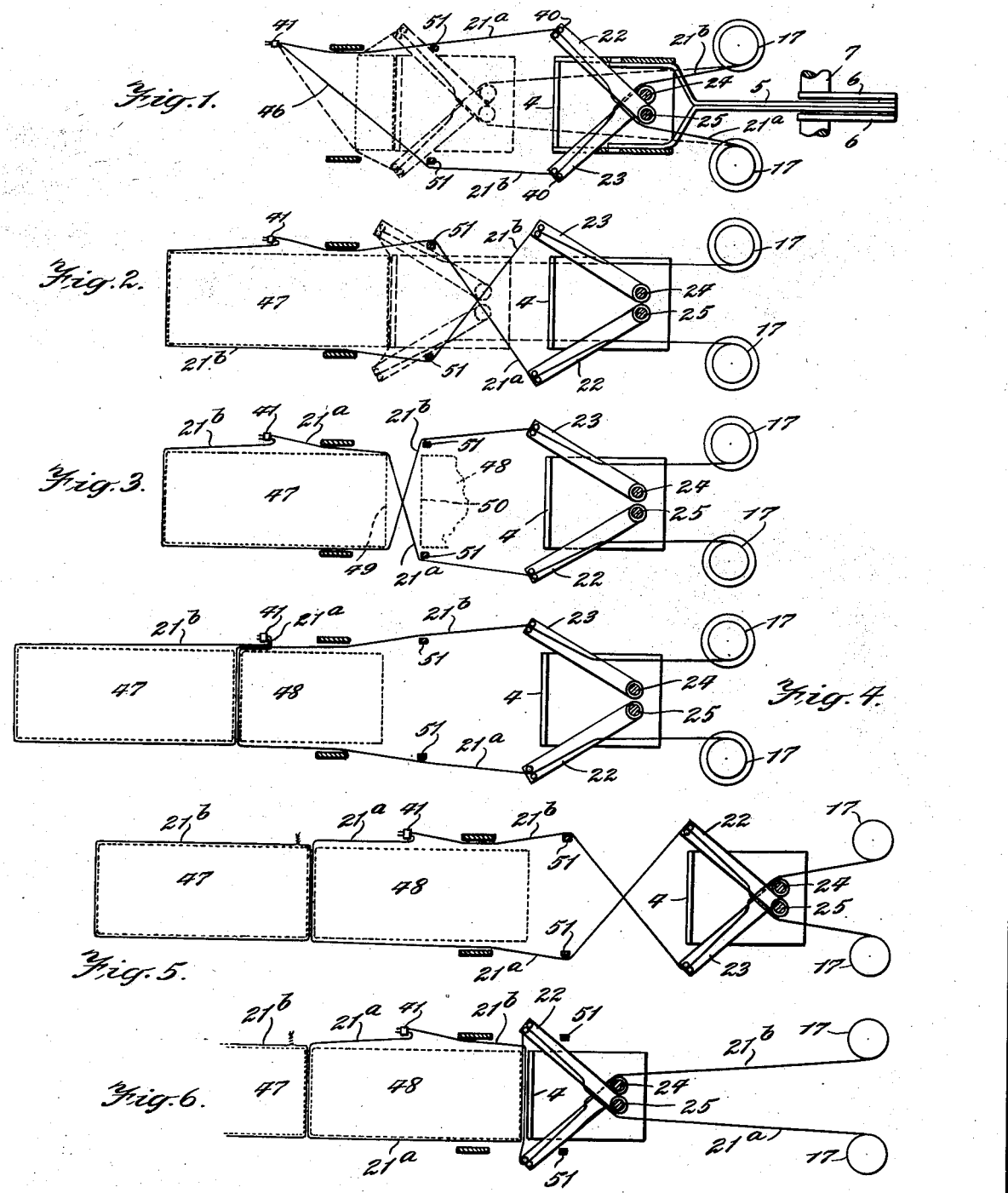

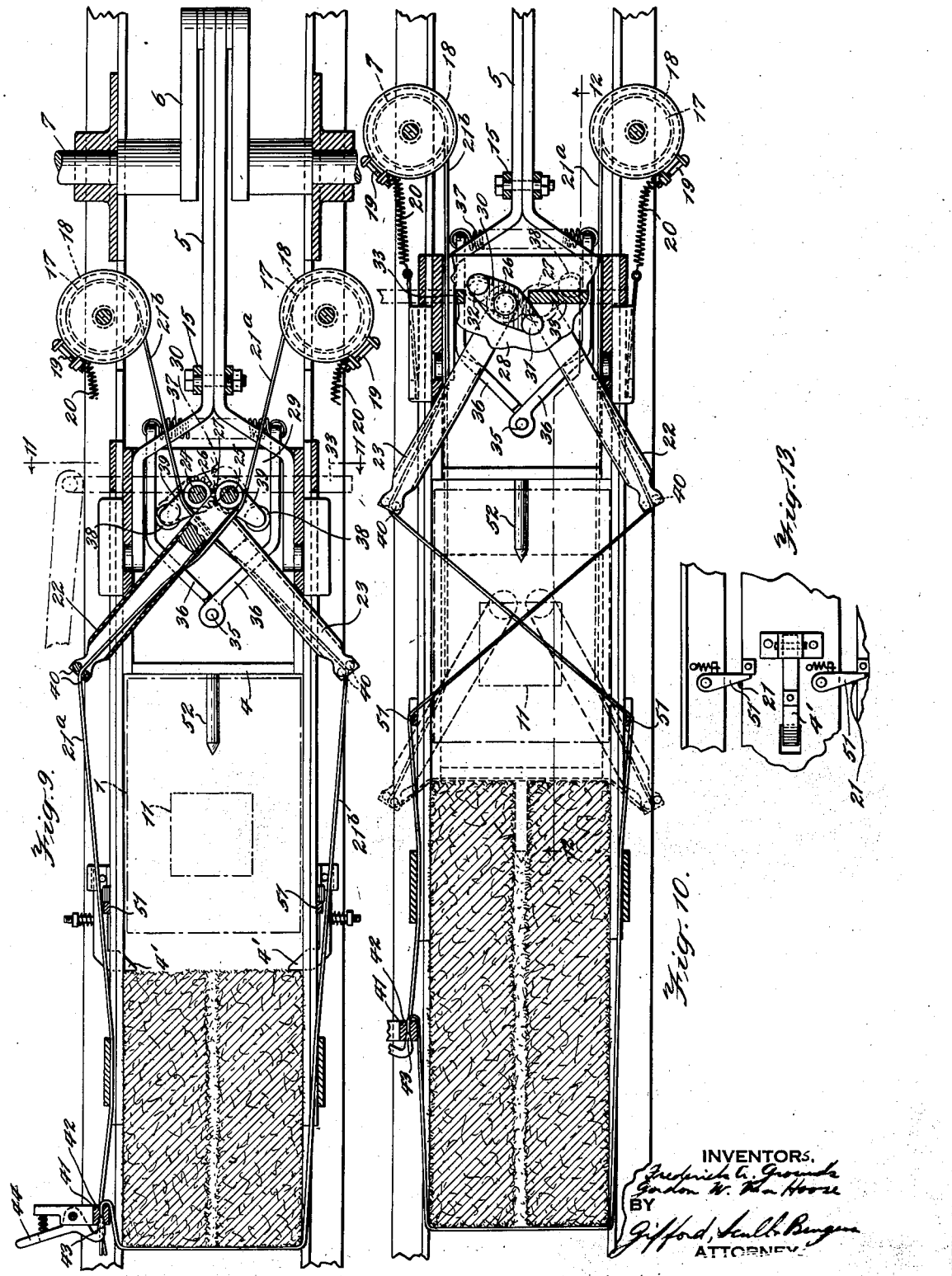

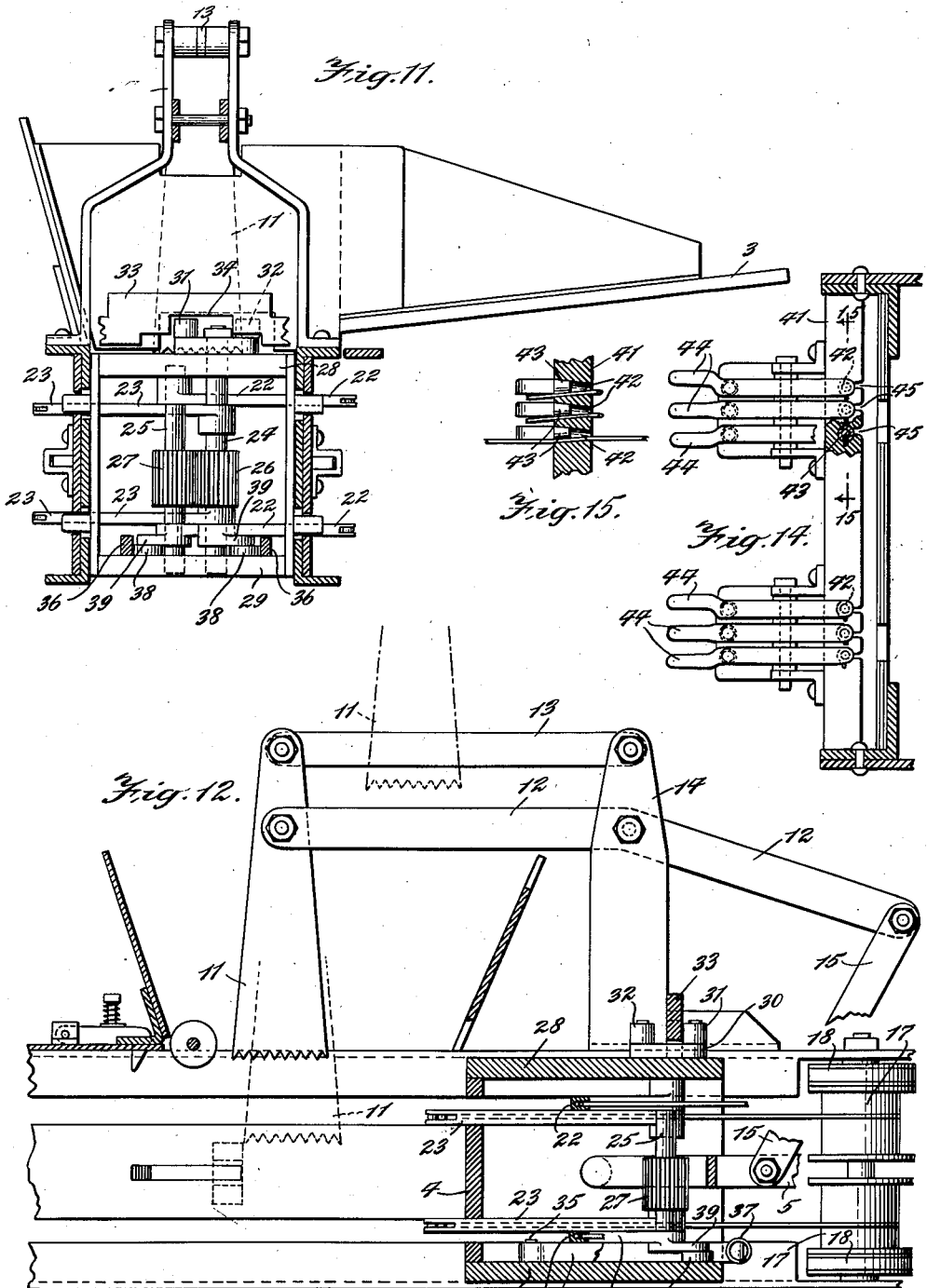

Patented Apr. 30, 1940

2,198,913

UNITED STATES PATENT OFFICE 2,198,913

METHOD FOR BINDING BALES OF HAY OR THE LIKE

Frederick A. Grounds, Minden, and Gordon W. Van Hoose, Shreveport, La.

Application May 10, 1938, Serial No. 207,004

15 Claims. (Cl. 100—20)

This invention relates to a novel and improved method for binding bales of hay or the like and to a machine by which the method may be practiced. The novel features of the invention will be best understood from the following description and the annexed drawings, in which we have illustrated the method diagrammatically and have shown one embodiment of a machine by which the method may be practiced. In the drawings:

Figs. 1 to 6, inclusive, are diagrams illustrating successive steps of the method;

Fig. 7 is a side elevation of a baling machine embodying means for practicing the method shown in Figs. 1 to 6;

Fig. 8 is a plan view of the structure shown in Fig. 7;

Fig. 9 is a plan view on an enlarged scale showing some of the structure shown in Fig. 8, certain parts being omitted and other parts broken away or shown in section;

Fig. 10 is a view similar to Fig. 9 but showing the parts in different operative positions;

Fig. 11 is a section approximately on the line 11—11 of Fig. 9;

Fig. 12 is a view approximately on the line 12—12 of Fig. 10;

Fig. 13 is a fragmentary view on an enlarged scale taken on the same plane as Fig. 7;

Fig. 14 is a view taken approximately on the line 14—14 of Fig. 8 on an enlarged scale;

Fig. 15 is a view taken approximately on the line 15—15 of Fig. 14.

Referring first to Figs. 7, 8, 9, and 10, we have shown the invention as embodied in a machine of known type and which comprises a press box 1 and a baling chamber 2. For the sake of convenience, we shall refer to the material being baled as hay, although it is to be understood that the invention may be used with any other material. Hay is fed in charges by hand or other means from a platform 3 into the press box and then is fed into the baling chamber by successive strokes of a reciprocating plunger 4, past pivoted pawls 4', which prevent the hay from coming back into the press box.

The plunger may be reciprocated by any usual mechanism, here shown as a link 5 pivoted to the plunger at one end and pivoted at the other end to a crank arm 6 on a shaft 7 which may be rotated by any suitable gearing, here shown as a large gear 8 on the shaft 7 meshing with a pinion 9 which may be driven through intermediate gearing from a belt 10. The charges are pressed down into the press box by means of a feed 11, this feed being moved downwardly during the time that the plunger is drawn out of the press box. The feed may be moved in any usual manner as by links 12 and 13 pivoted to the feed at one end and pivoted to a fixed part 14 on the machine. The link 12 extends beyond the fixed part 14 and is pivoted at one end to another link 15 which in turn is pivoted to the link 5. The entire mechanism described above may be supported on suitable wheels 16, as indicated, and by this arrangement the baling chamber is disposed at a convenient height for tying of the bales by hand.

The above described arrangement is typical of known mechanisms for baling material such as hay.

In the prior art, however, it has been common to introduce blocks into the press box at intervals to separate the hay in the baling chamber into bales which are bound with wire and the blocks are provided with grooves through which the wire may be threaded by hand. This requires two men, one on each side of the baling chamber, and also requires that the wire should be provided in sections or lengths. The man on one side of the chamber threads the two ends of the wire length through the grooves in blocks at opposite ends of a bale and these ends are taken by the man on the other side of the chamber and tied. According to our invention, as presently described, only one man is necessary and the use of the blocks is entirely eliminated. Moreover, when the blocks are inserted, the feed must be stopped, and this stoppage is also eliminated by our invention.

Usually the bales are bound with two wires, and for the purpose of illustration we have assumed that that is desired and we have shown a mechanism for so doing. Of course, it is to be understood that the invention can be practiced with any number of wires which may be found desirable. In the specification and claims we shall use the word "bale" as referring to the material before it is bound with the wires; in other words, as a mass of compressed material ready for the positioning of the tie bands.

Mounted on the sides of the machine are a plurality of spools 17 of wire, here shown as two on each side. Two spools are placed opposite each other, as plainly seen in Figs. 8, 9, and 10. For the sake of convenience of illustration and description, we have shown in Figs. 9 and 10 and also in Figs. 1 to 6, inclusive, one spool on each side of the machine and the wires wound on those spools. The spools are mounted to turn loosely so that the wire may be freely pulled therefrom, although a friction brake 18 is applied to each spool to prevent over-running. The proper tension may be applied by an adjustment device indicated at 19. Preferably also a spring 20 is attached to the brake band and to a fixed part of the machine so that the brake and spool may turn together against the action of the spring up to a certain point and then the spool will rotate in the brake. When any slack occurs in the wire, the spring will take it up.

The two wires which will now be referred to will be identified as 21a and 21b and these wires are threaded through threading arms 22 and 23 and then stretched along opposite sides of the baling chamber. The threading arms are adapted to move the wires across the machine, as will be presently described, and this may be done by movement of the plunger. One mechanism for performing this function is shown by way of illustration. The arms are shown as extending through horizontal slots in the walls of the press box and also through the walls of the plunger and as being rigidly secured to vertical shafts 24 and 25 which carry meshing pinions 26 and 27. These shafts 24 and 25 are pivotally mounted in the upper and lower walls 28 and 29 of the plunger, this plunger usually being hollow, as indicated. Rotation of one of the shafts 24 or 25 will cause rotation of the other in the opposite direction, as will be evident.

During normal feeding of the hay from the press box into the baling chamber, no movement of the arms will take place, but a suitable trip mechanism is provided for causing rotation of the shafts at a proper time. This trip mechanism is shown as being controlled by hand, because a workman usually must be in attendance on the machine. A hand operation is satisfactory under many conditions and therefore a hand-controlled device is shown.

The trip device may comprise a rocker arm 30 secured to the upper end of one of the shafts, here shown as the shaft 24, and extending upwardly from the rocker arm are two pins on which are mounted rollers 31 and 32 adjacent opposite ends of the arm. The rocker arm is shown as normally inclined to the axis of the machine, as best shown in Fig. 10, when the arms are stationary.

Slidably mounted on the frame of the machine is a trip bar 33 which, as best shown in Fig. 11, has a cut-out portion 34 which will clear one of the rollers 31 or 32, but not the other.
By moving the trip bar transversely of the machine, a solid part of the bar may be put in position where it will catch either one of the rollers desired. For example, assuming that the parts are in the position shown in Fig. 10, it will be seen that the roller 31 is in front of the trip bar and the roller 32 is behind it. The plunger is shown at the extreme right-hand position which it takes in its reciprocations. When the trip bar is in this position, continued reciprocation may take place without affecting the trip bar, the roller 32 passing through the space 34 in the bar. Now assume that it is desired to move the arms 22 and 23, the operator waits until the plunger has moved towards the left of Fig. 10 and then he moves the trip bar towards the bottom of Fig. 10 so that on the return stroke of the plunger, the roller 32 will engage a solid part of the bar 33 and turn both arms to swing them across the machine. This motion is made with a snap action by the mechanism which we will describe.

Swiveled at 35 in the bottom wall 29 of the plunger are two pressure arms 36 which extend lengthwise of the machine and are joined at their ends by a tension spring 37, thus urging them against rollers 38 mounted on arms 39 secured to the respective shafts 24 and 25. Thus when the threading arms 22 and 23 pass dead center, the spring 27 will cause them to move the rest of the way with a snap action, no matter which way they are moving. In Fig. 9 they are shown after having been moved in one direction, and in Fig. 10 they are shown as having been moved in the opposite direction, but in either case the motion is in the form of a snap action. Now the cut-out part 34 of the bar is in position where the roller 31 will pass freely therethrough, whereas the roller 32 will stop in front of the bar or to the left thereof, as shown in Fig. 10, at the extreme end of the right-hand movement of the plunger. This position of the rocker arm and its rollers is indicated in dotted lines in Fig. 9. Now when it is desired to swing the arms back to the position shown in Fig. 10, this may be done by moving the trip bar back to the position indicated in Fig. 10 where a solid part thereof will engage the roller 31 on the next movement of the plunger towards the right of Fig. 10 and then the same snap action takes place as before, causing the arms to move back to the position shown in Fig. 10.

The threading arms 22 and 23 may be of any suitable construction, although here we have shown each arm as being hollow and as having the wire threaded through the arm and out at the end thereof. At the end of each arm, preferably rollers 40 are provided between which the wire may pass. Assuming that the machine is to start operation, the wires 21a and 21b are threaded through the arms 22 and 23, for example as shown in Fig. 1. It is to be understood that either wire may be threaded through either one of the two arms. One wire is passed down on each side of the press box and then all wires are brought together and clamped in a holder 41, which is located at any suitable or convenient position at one side of the baling chamber. Preferably, holders are arranged in groups of three, as shown in Fig. 14, each group handling two wires and preferably each holder is of the form shown in Figs. 9, 13, and 15. In those figures, it will be seen that the holder has a bore 42 through which a single wire may be led and in which it is pressed by means of a spring-pressed tapered pin 43 which will permit pulling of the wire through the bore in one direction but will resist pulling it through in the opposite direction. This pin may be operated by a suitable handle 44, as shown. One side wall of the bore is provided with a slot 45 through which a wire may be slipped into the bore.

Referring now to Fig. 1, initially one of the wires, here shown as 21b, extends across the axis of the press box and baling chamber and through the baling chamber, it being understood that usually the press box and baling chamber will have a common axis, as shown. Assuming that the wires are in the position shown in Fig. 1 and the machine is set in operation, hay is fed towards the left of Fig. 1 and in doing so it will contact with the part 46 of the wire 21b and will ultimately bring it to some such position as shown in Fig. 2, the bale 47 being gradually formed as usual in this type of machine. While it is being formed, the two wires 21a and 21b will have their ends clamped at the holder 41, as stated above.

When a bale of the proper length has been formed, the operator will actuate the trip bar 33 and cause movement of the arms across the press box until they occupy some such position as shown in full lines in Fig. 2. This movement of the arms and the wire threaded therethrough will be caused by the backward movement of the plunger out of the press box and is completed before the plunger moves forward again into the press box. The result of the movement is to cross the wires in the path of movement taken by the material fed by the plunger, and the action takes place between the feeding of successive charges of material from the press box into the baling chamber.

Now when the plunger is given its next feeding movement into and through the press box, the result will be to cause the plunger and arms carried thereby to move from the position shown in full lines in Fig. 2 to that shown in dotted lines in the same figure, and this movement, as will be seen, results in placing the crossed wires against the end of the formed bale 47 and in front of the first charge of the next bale. Looked at in another way, the wires are crossed and held between succeeding charges of the material being baled, both wires being against the end 49 of the bale 47 and the end 50 of the forming bale 48. When the feeder arms are in the position shown in full lines in Fig. 2, the two wires are crossed and then when the arms are moved by reciprocation of the plunger to the position shown in dotted lines in Fig. 2, they are in place where the hay will be fed in behind the crossed wires, as indicated at 48 in Fig. 3. Thus the wire 21b is forced against the end 49 of the bale 47 and the wire 21a is against the same end 49 of the bale 47 and is also against the end 50 of the newly formed bale 48.

When the wires are in the position shown in Fig. 1, they engage pivoted dogs 51 which may operate by gravity, or by spring action as indicated in Fig. 13. When the threading arms are moved from the position shown in full lines in Fig. 2 to the position shown in dotted lines in the same figure, each wire may be snapped past both dogs against the action of their springs and then the two wires will be held by the dogs in the position shown in Fig. 3.

The feeding of the hay continues now until some such condition is achieved as shown in Fig. 4, where it will be seen that the end of the wire 21b, which has been clamped in the holder, has been pulled around the bale 47 until it overlaps another section of the same wire which has now been forced around the bale 47 and along one side of the bale 48 for a short distance. The wire 21b may now be cut adjacent the holder and tied to the end of the same wire held in the holder, either by hand or by any suitable tying device. Such devices are known and any suitable one may be used. Before cutting, however, the wire 21b is slipped through the slot 45 into the eye of a vacant holder, it being understood that a separate holder is provided for each wire and one holder has been used for each of the wires 21a and 21b, as indicated in Fig. 1. Preferably, a vacant holder is thus always provided in each group of three. By first clamping the wire in the third holder, it is possible to let the feeding continue and then the wire may be cut and tied at any later convenient time and simultaneously the wire is always kept under proper tension.

Feeding now continues until the bale 48 is completed and then the trip bar 33 is again actuated, as described above, to return the arms 22 and 23 to the position shown in Fig. 1 and also shown in Fig. 5. This swinging of the arms will result in again crossing the wires behind the completed bale 48 and in front of the first charge of material which will form the next bale. Then on the next feeding movement of the plunger, each wire again snaps by both of the dogs 51 to some such position as shown in Fig. 6. The feeding movement will continue until the end of the wire 21a which is held at the holder 41 overlaps another section of that wire in the same manner as shown in connection with the wire 21b in Fig. 4. Then the wire 21a is inserted in a vacant holder, after which it may be cut and tied.

The above described operations are repeated as long as the baling takes place.

For convenience, we have referred to the use of wire in binding the bale, although by that word we intend to cover any kind of material which may be handled in the manner indicated herein. For example, flat strips of metal may be used as well as cord. In any case, the binding material is formed in one or more bands ultimately extending around a bale and tied in place. We have shown the formation of two bands in approximately parallel planes, these planes being substantially the same on successive bales, and successive bands in the same plane being formed around successive bales, first with one of two wires and then with the other wire.

One advantage of our invention is that with the elimination of blocks it is possible to provide on the head of the plunger a spike 52 which, on each feeding movement of the plunger, will form a hole in each charge so that when the bale is completed, there will be a continuous hole therethrough. For example, the spike may be located in the middle of the plunger so that there will be a hole extending through the longitudinal center of the bale. If more than one hole is required, then a corresponding number of spikes can be used. Each hole forms a ventilating means which is desirable to prevent spontaneous combustion or molding because of moisture in the bale.

While we have shown the invention as embodied in a specific form, it is to be understood that various changes in details may be made without departing from the scope of the invention, as defined by the appended claims. While the words "bale" and "wire" have been used for convenience, it is to be understood that those words are not used in a limiting sense. The word "wire" is used in a broad sense as meaning any flexible element which may be used to tie a bale and in turn the word "bale" is also used in a broad sense to define any material which is to be tied or bound by the "wire".

We claim:

1. The method of binding a bale which comprises feeding material to be baled, disposing two separate wires on opposite sides of the path taken by said material with one wire extending across said path, forcing material between said wires to form the bale and then extending both wires across said path past the rear end of the formed bale and across each other, feeding more material against said crossed wires to form another bale, crossing said wires again past the rear end of said other bale and tying one wire to itself around one of said bales and the other wire to itself around the other bale.

2. The method of binding a bale which comprises feeding material to be baled, disposing two separate wires on opposite sides of the path taken by said material with one wire extending across said path, feeding material between said wires to form the bale and then extending both wires across said path past the rear end of the formed bale and across each other, feeding more material against said crossed wires to form another bale, crossing said wires again past the rear end of said other bale, continuing said feeding until one wire extends completely around said formed bale and overlaps itself, and tying together the overlapping portions thereof.

3. The method of binding a series of bales with wire bands disposed substantially in common planes which comprises feeding successive charges of material, placing two wires in each of said planes, disposing said wires on opposite sides of successive bales and crossing them between the last feeding charge of one bale and the first feeding charge of the next bale, and alternately tying each wire to itself to complete a band.

4. The method of binding a series of bales with wire bands disposed substantially in common planes which comprises placing two wires in each of said planes, disposing said wires on opposite sides of successive bales and crossing them between successive feeding charges of the material being baled, and alternately tying each wire to itself to complete a band.

5. The method of binding a series of bales with wire bands disposed substantially in common planes which comprises placing two wires in each of said planes, disposing said wires on opposite sides of successive bales, crossing them between successive feeding charges of the material being baled, and forcing said crossed wires directly against the ends of abutting successive bales formed by said charges, by the feeding of the material being baled.

6. The method of binding a series of bales with wire bands disposed substantially in common planes which comprises placing two wires in each of said planes, disposing said wires on opposite sides of successive bales, crossing them between successive feeding charges of the material being baled, forcing said crossed wires directly against adjacent ends of successive bales formed by said charges, by the feeding of the material being baled, and alternately tying each wire to itself to complete a band.

7. The method of binding a series of bales which comprises placing two wires on alternate opposite sides of successive bales by crossing said wires between successive bales, and tying said wires around the bales.

8. The method of binding a series of bales which comprises placing two wires on alternate opposite sides of successive bales by crossing said wires between successive bales, and tying alternate wires to themselves around alternate bales, to form from each wire a complete band around a bale.

9. The method of binding a bale which comprises feeding material from a press box along a baling chamber approximately coaxial therewith, placing two spools of wire on opposite sides of the axis of said box and chamber and on the side of the box opposite the chamber, stretching the wire from one of said spools along one side of said box and chamber and securing it on that side in relatively fixed position, stretching the second wire from the other spool across said chamber and securing it in approximately the same fixed position as the first wire, feeding the material from said box along said chamber against said second wire, and drawing said second wire from its spool until the bale is formed, after completion of the formation of the bale crossing said wires behind the bale, continuing feeding of said material until the rear end of said formed bale is approximately opposite said position, and tying said second wire to its end at said position.

10. The method of binding a series of bales which comprises fastening the ends of two wires at one side of a baling chamber with one wire extending along one side of said chamber towards a press box and the second wire extending across said chamber, feeding material from said box through said chamber into contact with the second wire until a bale is formed which is partially surrounded by said second wire, then crossing said wires behind said formed bale and feeding more material against said crossed wires to start the next bale, tying said second wire around said formed bale, cutting it, securing the new end thereof at said position, and repeating the foregoing operation to tie the first-named wire around the next bale.

11. The method of binding a series of bales which comprises feeding material along a baling chamber, placing two spools of wire on opposite sides of said chamber, pulling the wires from said spools and fastening the ends thereof in position on one side of the chamber with one wire extending through the chamber, feeding material through said chamber to form the series of bales, crossing said wires behind the rear end of each bale and in front of the front end of the succeeding bale, and tying each wire around alternate bales.

12. The method of binding a series of bales which comprises feeding material along a baling chamber, placing two spools of wire on opposite sides of said chamber, pulling the wires from said spools and fastening the ends thereof in position on one side of the chamber with one wire extending through the chamber, feeding material through said chamber to form the series of bales, crossing said wires behind the rear end of each bale and in front of the front end of the succeeding bale, tying each wire around alternate bales, and securing the new ends of the wires at said position.

13. The method of binding a bale which comprises feeding material to be baled along a path, holding a wire at a point on one side of said path closely adjacent thereto, extending said wire from said point across said path, forcing said material against said wire and thereby extending it across the forward end and along both sides of the forming bale, then extending said wire across the rear end of the formed bale and tying it to the portion of the wire held at said point, clamping said wire at said point and then extending said wire first lengthwise of said path along said one side thereof and along the same side of the next bale and then across the rear end of that bale and the front end of a third bale.

14. The method of binding a series of bales which comprises feeding material along a baling chamber, securing two wires at one side of said chamber with one wire extending lengthwise thereof and the other extending across the chamber, feeding material against said other wire until a bale is formed which is partially surrounded by said other wire, then extending both of said wires across said chamber behind said formed bale and feeding more material against said wires to start the next bale, tying said other wire around said formed bale, cutting it, and repeating the foregoing operation to tie the first-named wire around the next bale.

15. The method of binding a series of bales which comprises placing two wires on alternate opposite sides of successive bales by extending said wires between successive bales, and tying alternate wires to themselves around alternate bales, to form from each wire a complete band around a bale.

FREDERICK A. GROUNDS.
GORDON W. VAN HOOSE.